United States Patent [19]

Murakami et al.

[11] Patent Number: 4,983,244

[45] Date of Patent: Jan. 8, 1991

[54] PROCESS FOR PRODUCING GRAPHITE BLOCKS

[75] Inventors: Mutsuaki Murakami, Tokyo; Susumu Yoshimura, Yokohama; Naomi Nishiki, Kyoto; Katsuyuki Nakamura, Osaka; Kazuhiro Watanabe, Kawasaki, all of Japan

[73] Assignee: Matsushita Electric Industrial Co., Ltd., Japan

[21] Appl. No.: 409,355

[22] Filed: Sep. 19, 1989

[30] Foreign Application Priority Data

| Sep. 20, 1988 | [JP] | Japan | 63-235219 |
| Sep. 20, 1988 | [JP] | Japan | 63-235218 |
| Sep. 20, 1988 | [JP] | Japan | 63-235217 |

[51] Int. Cl.⁵ .................. B29C 65/02; C01B 31/02; C01B 31/04
[52] U.S. Cl. .................. 156/224; 156/228; 156/245; 156/285; 156/309.9; 264/29.6; 264/29.7; 264/232; 264/248; 264/250; 264/294; 264/295; 264/322; 264/331.12; 264/331.19; 264/344; 264/571; 423/448; 423/449
[58] Field of Search .................. 264/29.1, 29.6, 29.7, 264/85, 232, 248, 250, 319, 320, 325, 332, 344, 571, 322, 331.12, 331.19, 294, 295; 156/224, 228, 245, 308.2, 285, 309.9; 423/445, 448, 449

[56] References Cited

U.S. PATENT DOCUMENTS 4,876,077 10/1989 Murakami .................. 423/448

FOREIGN PATENT DOCUMENTS

| 203581 | 12/1986 | European Pat. Off. | 423/448 |
| 60-195014 | 10/1985 | Japan | 264/29.1 |
| 61-275117 | 12/1986 | Japan | 423/448 |
| 61-275118 | 12/1986 | Japan | 423/448 |

Primary Examiner—Jeffery Thurlow
Assistant Examiner—Leo B. Tentoni
Attorney, Agent, or Firm—Lowe, Price, LeBlanc, Becker & Shur

[57] ABSTRACT

Graphite blocks are produced by a process wherein one or plural polymer films having a thickness of from 1 to 400 μm and selected from aromatic polyimides, aromatic polyamides and polyoxadiazoles are heat treated to obtain carbonaceous films. A plurality of the carbonaceous films are hot pressure under certain conditions to obtain thick graphite blocks. The blocks have a remarkably improved rocking characteristic and are useful as radiation optical elements such as X-ray or neutron ray monochromators or filters. The blocks may be curved to obtain bent-type graphite articles.

16 Claims, 2 Drawing Sheets

PROCESS FOR PRODUCING GRAPHITE BLOCKS

BACKGROUND OF THE INVENTION

1. Field of the Invention

This invention relates to a process for producing graphite blocks which have utility as X-ray and neutron ray monochromators, neutron ray filters and the like.

2. Description of the Prior Art

Graphite holds an important position as industrial materials because of its outstanding heat and chemical resistances, and high electric conductivity, and has been widely used as electrodes, heating elements and structural materials. Especially, single crystal graphite has good spectral and reflective characteristics and has been widely used as X-ray or neutron ray monochromators, filters or spectral crystal articles.

Natural graphite may be used for such purposes. Natural graphite with high quality occurs in an extremely limited amount and is intractable because of its powder or block form. Therefore, efforts of producing artificial graphite having such characteristics as natural single crystal graphite have been made. The production of such artificial graphite can be broadly classified into the following two processes.

In the first process, graphite is produced by separation from the melts of Fe, N/C system, decomposition of carbides of Si, Al and the like, or cooling of carbon melts under high temperature and high pressure. The graphite obtained by the process is called Kish graphite, and has the same properties as those of natural graphite. According to this process, however, only fine flakes of graphite are obtained. Therefore, together with the complexity of the manufacturing process and the expensive cost, this process has not been used in the industrial production.

The second process is one in which graphite is produced by pyrogenic deposition in a gas phase and hot working of gaseous hydrocarbons wherein re-annealing is effected at a temperature of 3400° C. for a long time under pressure. Graphite thus obtained is called highly oriented pyrographite (HOPG) and has almost the same properties as those of natural graphite. This process enables one to produce graphite of very large sizes, unlike Kish graphite. This process has, however, the disadvantage that the manufacturing process is complicated with a low yield and the cost is very high.

In order to solve the problems involved in the above two processes and to produce graphite easily and inexpensively, graphitization of various organic matters or carbonaceous materials by heating at temperature not lower than 3000° C. has been attempted. In this process, graphite having the same characteristics as those of natural graphite or Kish graphite cannot be obtained.

Most of the polymeric materials cannot rather be used for this purpose. For example, the thermal treatment has been attempted to graphitize polymers such as phenolformaldehyde resins, polyparaphenylenes, polyparaphenylene oxides, polyvinyl chloride and the like. Since all of these polymers belong to a class of non-graphitizable materials, any product having a high degree of graphitization has not yet been obtained. For example, natural graphite and Kish graphite have an electric conductivity, which is the most typical property of graphite, of from $1 \times 10^4$ S/cm to $2.5 \times 10^4$ S/cm. In contrast, only the product having $1 \times 10^3$ S/cm to $2 \times 10^3$ S/cm can generally be obtained by this process. This indicates that graphitization does not well proceed in this process.

We extensively made studies to solve the problems of the manufacturing process of graphite from such polymers as set out above wherein a number of polymers were used for graphitization. As a result, it was found that films of polymers such as an aromatic polyamide (PA), a polyoxadiazole (POD), an aromatic polyimide (PI), three polybenzobisthiazoles (PBBT), a polybenzooxazole (PBO), a polybenzobisoxazole (PBBO), a polythiazole and the like could be easily graphitized. Based on this finding, we proposed a graphitization process in European Patent Application No. 0 205 970. According to this process, graphite having a high degree of graphitization can be obtained easily within a short time by heating the polymers indicated above to temperatures not lower than 1800° C., preferably not lower than 2500° C.

The degree of graphitization is often expressed by X-ray diffraction parameters such as a lattice constant and a crystallite size in the direction of c axis, or by a rate of graphitization calculated therefrom, along with electric conductivity. The lattice constant is calculated from the (002) refraction line of X-ray, and a value nearer to the lattice constant of natural single crystal graphite of 6.708 angstroms indicates a more developed structure of graphite. The crystallite size in the direction of c axis is calculated from the half-width value of the (002) refraction line. A larger crystallite size indicates a more development of the plain structure of graphite. The crystallite size of natural single crystal graphite is 1000 angstroms or over. The degree or rate of graphitization is calculated from face spacing ($d_{022}$) (Les Carbons Vol. 1, p. 129, 1965). As a matter of course, the degree of graphitization of natural single crystal graphite is 100%. The electric conductivity is a value determined along the direction of ab plane of graphite wherein a larger electric conductivity shows a more resemblance to the graphite structure. Natural single crystal graphite has an electric conductivity of $1 \times 10^4$ to $2.5 \times 10^4$ S/cm.

Another X-ray diffraction parameter used to evaluate the graphite structure is a rocking characteristic showing the manner of superposition of the ab planes. This is called a diffraction intensity curve which is obtained by rotating the crystal when monochromatic parallel X-ray fluxes are passed and measuring by fixing the value of $2\theta$ at the angle where the (00 l) diffraction line appears and rotating the angle, $\theta$. This value is evaluated by the half-width value of the absorption and expressed by the angle of rotation (°). A smaller value shows more clearly superposed ab planes.

The process of producing graphite from aforedescribed polymer films of the specific type is a very good process since it is simple and inexpensive. However, further studies revealed that this process had several drawbacks.

The first problem is that thick graphite blocks cannot be produced according to the process. The graphitization reaction may be considered to be apparently irrespective of the thickness of the starting film. In fact, this reaction depends strongly on the thickness of starting film. This has not been known but we experimentally confirmed the above fact. For instance, Table 1 shows the results of a test where four films of a polyoxadiazole with different thicknesses were graphitized to determine the lattice constant, degree of graphitization and electric conductivity along the ab planes of the resultant graphite.

TABLE 1

| Thickness of Starting POD Film (μm) | Treating Temperature (°C.) | Lattice Constant (angstroms) | Degree of Polymerization (%) | Electric Conductivity (S/cm) |
|---|---|---|---|---|
| 5 | 2600 | 6.710 | 99 | 9800 |
| 25 | 2600 | 6.713 | 97 | 7800 |
| 100 | 2600 | 6.720 | 94 | 6100 |
| 450 | 2600 | 6.731 | 87 | 4900 |

The above results demonstrate that the thickness of the POD film apparently influences how the graphitization reaction proceeds. For example, the degree of the graphitization varies from 99 to 87%, depending on the thickness of the film. This reveals that a thin film of graphite is obtained, but a thick graphite block is difficult to obtain.

The second problem of the prior art process is that mere heating of polymer materials does not improve the rocking characteristic.

The rocking characteristic is an important characteristic when graphite crystals are used as an X-ray optical element although the thickness and rocking characteristic of graphite crystal depend on the type of radiation optical element as will be described hereinafter. With the POD graphite indicated in Table 1, the rocking characteristic is 6.7° for the starting film thickness of 5 μm, 10.5° for the starting film thickness of 25 μm, 12° for the starting film thickness of 100 μm, and 17° for the thickness of 400 μm. Thus, the rocking characteristic is far from satisfactory. Thick radiation optical elements having a good rocking characteristic cannot be obtained by mere heating of polymer films for graphitization. It is considered that the cause for the poor rocking characteristic resides in a difficulty in orientation of the ab planes because a greater film thickness permit gases to generate in larger amount from the inside of the film undergoing the thermal treatment.

SUMMARY OF THE INVENTION

It is an object of the invention to provide a process for producing graphite blocks from polymer films which solves the problems of the prior art processes.

It is another object of the invention to provide a process for producing thick graphite blocks which are particularly suitable for use as X-ray and neutron ray monochromators and neutron ray filters.

It is a further object of the invention to provide a process for easily producing a radiation optical element made of a curved graphite crystal of the single or double bent type which has heretofore been very difficult to produce.

Broadly, the above objects can be achieved according to the invention by a process which comprises thermally treating a 1 to 400 μm thick film of a polymer selected from the group consisting of aromatic polyimides, aromatic polyamides and polyoxadiazoles at a temperature sufficient to convert the film to a carbonaceous film, superposing a plurality of the carbonaceous films, and subjecting the plurality of carbonaceous films to hot pressing at a pressure of not higher than 20 kg/cm$^2$ in a temperature range of not higher than 2800° C. and then at a pressure higher than 20 kg/cm$^2$ in a temperature range of higher than 2800° C., thereby forming a graphite block.

Alternatively, the graphite block may be obtained by hot pressing the carbonaceous films at temperature of not lower than 800° C. in such a way that the pressure is increased from zero to a level not higher than 200 kg/cm$^2$ and decreased to zero or a level lower than the first-mentioned level, and the pressure increasing and decreasing procedure is repeated several to several tens times whereby the resultant graphite block is wrinkle-free. In this embodiment, the pressure is thus intermittently, not continuously, applied to the films.

Still alternatively, the graphite block may be obtained by heat treating a plurality of 1 to 400 μm thick films of a polymer selected from the group consisting of aromatic polyimides, aromatic polyamides and polyoxadiazoles at a temperature sufficient to convert the film to carbonaceous films, and hot pressing the plurality of the carbonaceous films at a pressure of not higher than 20 kg/cm$^2$ in a temperature range of not higher than 2800° C. and then at a pressure higher than 20 kg/cm$^2$ in a temperature range of higher than 2800° C. for a time sufficient for graphitization, thereby forming a graphite block.

Moreover, when a plurality of the carbonaceous films obtained by the above procedures are hot pressed against a curved surface at a temperature sufficient for graphitization at a pressure not lower than 4 kg/cm$^2$, a curved graphite article is obtained for use as a radiation optical element. Moreover, when the starting polymer film or films are shaped in the form of a dome, thermally treated to form a carbonaceous shaped article and hot pressed in a dome-shaped mold, a double-bent graphite article can be obtained.

For appropriate application as radiation optical elements, the graphite block should preferable have a certain thickness and a certain rocking characteristic depending on the type of optical element. When used as an X-ray monochromator, the graphite block should preferably have a thickness of not smaller than 0.1 mm and a rocking characteristic of not larger than 1°. For application as a neutron ray monochromator, the thickness should preferably be not smaller than 2 mm with a rocking characteristic of not larger than 1.5°. and for application as a neutron ray filter, the thickness should preferably be not smaller than 1 cm with a rocking characteristic of not larger than 4°. The graphite block having such a great thickness as indicated above with a good rocking characteristic can be obtained according to the process of the invention.

DETAILED DESCRIPTION AND EMBODIMENTS OF THE INVENTION

Figure 1A:
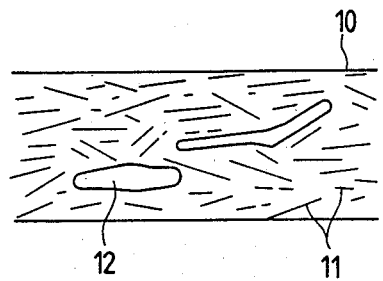
FIGS. 1a to 1c are, respectively, schematic sectional views of structures of carbonaceous films for comparison.

The broad aspect of the present invention is first described wherein a film of a certain polymer is thermally treated to provide a carbonaceous film, and a plurality of the carbonaceous films are superposed. The superposed films are hot pressed at a pressure not higher than 20 kg/cm² in a temperature range of not higher than 2800° C. and then at a pressure higher than 20 kg/cm² in a temperature range of higher than 2800° C. to obtain a graphite block.

In the practice of the invention, starting films should be made of a polymer selected from aromatic polyimides, aromatic polyamides and polyoxadiazoles.

Polyoxadiazoles useful in the present invention include, for example, poly(p-phenylene-1,3,4-oxadiazole) having recurring units of the following formula

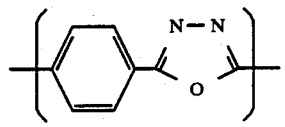

Polymers of other oxadiazole isomers are also usable including poly(m-phenylene-1,3,4-oxadiazole), poly(p-phenylene-1,2,4-oxadiazole), poly(m-phenylene-1,2,4-oxadiazole), poly(o-phenylene-1,3,4-oxadiazole), poly(o-phenylene-1,2,4-oxadiazole), and copolymers of these oxadiazole isomers.

The aromatic polyimides are polymers which are obtained by reaction between dicarboxylic acid anhydrides and aromatic primary diamines and are represented by the following general formula

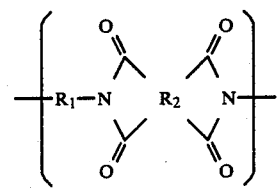

Poly[N,N'-(p,p'-oxydiphenylene)pyromellitimide is typical of the aromatic polyamide of the above formula

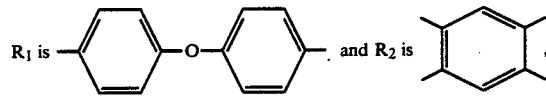

commercially available from Du Pont De Nemours under the designation of Kapton.

In the above formula, $R_1$ may be

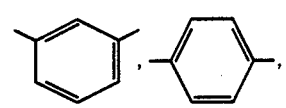

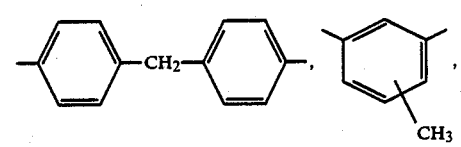

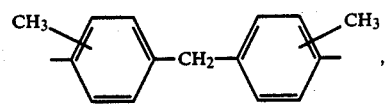

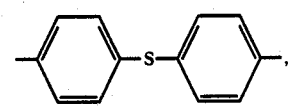

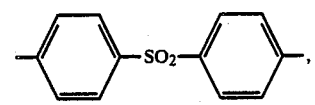

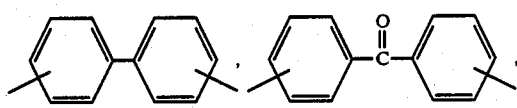

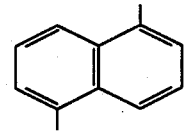

and the like, and $R_2$ may be

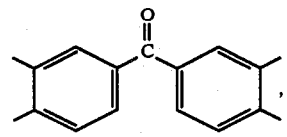

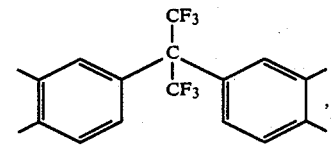

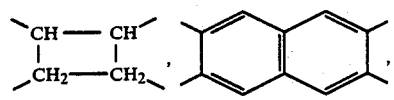

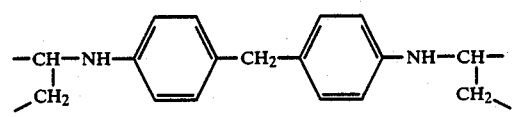

The aromatic polyamides used in the present invention are ones which have recurring units of the following formula

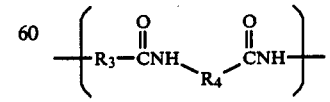

wherein $R_3$ represents

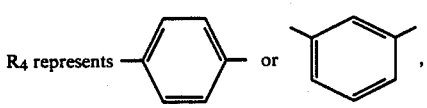

The film of these polymers should have a thickness of from 1 to 400 μm, preferably from 1 to 200 μm. If the film thickness is over 400 μm, gases are produced in the films during the course of carbonization and graphitization, and the resultant carbon precursor does not become homogeneous in the inner structure and is thus non-graphitizable carbon. If this precursor is subsequently hot pressed, graphite of good quality cannot be obtained. The lower limit of the film thickness is not critical, but if the thickness is less than 1 μm, a greater number of carbonaceous films have to be produced for the production of graphite blocks for the same thickness, thus being poor in economy.

The thermal treatment of the polymer film or films is carried out at a temperature sufficient to provide a carbonaceous film. The temperature is usually in the range of from 450° to 2000° C. Although the thermal temperature may be performed at temperatures over 2000° C., better results are obtained when hot pressing the thermally treated films in the temperature range defined above. The thermal treatment is a preliminary step prior to the hot pressing. In the thermal treatment, the polymer films may be treated separately or after superposition. The separate treatment is preferred in this embodiment. Especially, when the films being treated have a thickness of a little less than 400 μm, the films should be treated separately. When the polymer films are thermally treated in a superposed condition, gas generation from the polymer films is suppressed so far, with the disadvantage as experienced in a thick film.

After the carbonaceous films have been produced through such a preliminary thermal treatment as described above, a plurality of the carbonaceous films are superposed and subjected to hot pressing which is a real heating and pressing procedure, so that graphitization of the carbonaceous films is caused to proceed thereby obtaining a graphite block. In the hot pressing step, the manner of application of the pressure and temperature control are important. More particularly, the hot pressing should be effected by pressing the films while removing wrinkles from the carbonaceous films which have been produced during the thermal treatment. For this purpose, the pressure of not higher than 20 kg/cm² is desirable in a temperature range of not higher than 2800° C. If a higher pressure is applied in the temperature range, the carbonaceous films are often apt to break. Preferably, gradual application of the pressure without abrupt application is effective in suppressing the breakage. At temperatures higher than 2800° C., a pressure higher than 20 kg/cm² is necessary for attaining complete bonding of the films. At lower pressures, satisfactory press bonding is not obtained. The time of the hot pressing is not critical and is sufficient to allow satisfactory press bonding. The time is, for example, in the range of from several tens minutes to several hours.

It will be noted that when polymer films are thermally treated and hot pressed, the thickness is reduced to about half the initial thickness.

The thermal treatment and hot pressing are usually carried out in an inert gas atmosphere such as $N_2$, Ar or the like.

Through the above production process, there is obtained a thick graphite block which has a remarkably improved rocking characteristic. For example, when the POD films indicated in the Prior Art and having thicknesses of 4, 25, 100 and 450 μm, respectively, are each thermally treated at 1000° C. to obtain carbonaceous films. Ten carbonaceous films of the respective thicknesses are superposed and hot pressed. The hot pressing is effected by applying a pressure of 4 kg/cm² up to 2800° C. and then a pressure of 20 kg/cm² over 2800° C., followed by keeping at 3000° C. for a given time, thereby obtaining graphite blocks. The graphite blocks having a thickness of from 20 μm to 2.25 mm with a rocking characteristic of from 0.8° to 1.8° are obtained. This allows the graphite blocks to be used as X-ray and neutron ray monochromators. As a matter of course, more thick blocks may be likewise obtained. As will be seen from the above, the rocking characteristic is remarkably improved. It will be noted that when hot pressed, the thickness of the starting films is reduced to about ½.

Examples of this embodiment are described. In the examples, the extent of graphitization was evaluated by measuring the lattice constant, rate of graphitization, electric conductivity and rocking characteristic according to the following procedures.

(1) Lattice Constant ($C_o$)

The X-ray diffraction line of sample is measured by the CuKα ray using a Philips Model PW-1051 X-ray diffractometer. The value of $C_o$ is calculated from the (002) diffraction line which appears in the neighbourhood of 2 θ equal to 26° to 27° by the use of the following Bragg's equation:

$$n\lambda = 2d \sin \theta$$

where $2d$ is equal to $C_o$, n is equal to 2, and λ is the wavelength of X-ray.

(2) Degree of Graphitization (%)

Degree of graphitization is calculated from the value of face spacing (d) according to the following equation:

$$d_{002} = 3.354 g + 3.44(1-g)$$

where g represents the degree of graphitization, from the perfect graphite when g=1 to the amorphous graphite where 9=0.

(3) Electric Conductivity (S/cm)

The sample is fitted with four-terminal electrodes by using silver paste and golden wires. The electric conductivity is determined by applying the electric current to the outer electrodes and measuring the voltage drop at the inner electrodes, and further determining the width, length and thickness of the sample through a microscope.

(4) Rocking Characteristic (°)

The rocking characteristic at the peak position of the (002) diffraction line of graphite is measured by the use of an Rotor Flex RU-200B X-ray diffraction apparatus, made by Rigaku Denki K. K. The rocking characteristic is determined as the half-value width of the obtained absorption.

EXAMPLE 1

Each of 10 μm thick films of polyoxadiazole, aromatic polyamide and aromatic polyimide was placed between graphite plates and heated at a heating rate of 20° C./minute up to 1000° C., at which it was maintained for 1 hour and was thus heat treated, thereby obtaining a carbonaceous film.

Twenty carbonaceous films of the respective polymers were superposed and hot pressed by the use of a ultra-high temperature hot press, made by Chuugai Furnace Ind. Co., Ltd., thereby obtaining graphite blocks. The hot pressing was effected in such a way that the films were heated at a rate of 10° C./minute and gradually imposed with a pressure in a temperature range of from 1000° to 2800° C., the final pressure being 20 kg/cm$^2$. Over 2800° C., the pressure was increased to 40 kg/cm$^2$, followed by pressing at 3000° C. for 1 hour. The physical properties of these graphite blocks are shown in Table 2 below.

TABLE 2

| Film Material | Lattice Constant C. (angstroms) | Degree of Graphitization (%) | Electric Conductivity (S/cm) | Rocking Characteristic (°) |
|---|---|---|---|---|
| polyoxadiazole | 6.708 | 100 | 18900 | 0.9 |
| aromatic polyamide | 6.708 | 100 | 19000 | 0.8 |
| aromatic polyimide | 6.708 | 100 | 20000 | 0.65 |

The above results reveal that the graphite blocks have a rocking characteristic ranging from 0.65° to 0.9°, giving evidence that graphite blocks having a good rocking characteristic can be produced.

EXAMPLE 2

Aromatic polyimide films having thicknesses of 2, 10, 25, 50, 100, 200 and 400 μm, respectively, were thermally treated at 1000° C. in the same manner as in Example 1, thereby obtaining carbonaceous films. Five to twenty films of the respective thicknesses were hot pressed under the same conditions as used in Example 1 to obtain graphite blocks having different thicknesses. The rocking characteristic of individual blocks is shown in Table 3.

TABLE 3

| Sample No. | Thickness of Starting Film (μm) | Number of Superposed Films | Rocking Characteristic (°) |
|---|---|---|---|
| 1 | 2 | 20 | 0.50 |
| 2 | 10 | 20 | 0.65 |
| 3 | 10 | 10 | 0.62 |
| 4 | 25 | 20 | 0.67 |
| 5 | 25 | 10 | 0.65 |
| 6 | 50 | 10 | 0.67 |
| 7 | 100 | 10 | 0.72 |
| 8 | 200 | 10 | 0.85 |
| 9 | 200 | 5 | 0.82 |
| 10 | 400 | 5 | 0.96 |

From the above results, it will be seen that the graphite block obtained according to the invention should have a rocking characteristic of not larger than 1°.

More particularly, a larger thickness of starting polymer film results in a poorer rocking characteristic. When the number of superposed films increases, there is the tendency toward a slightly poor rocking characteristic, but the tendency is not so significant.

Another embodiment of producing thick graphite blocks with a good rocking characteristic is described.

In this embodiment, the general procedure is the same as that described in the first embodiment except that the hot pressing is effected at temperatures of not lower than 800° C. while applying pressures intermittently. More particularly, the hot pressing is effected in such an intermittent way that the pressure is increased from zero to a level not higher than 20 kg/cm$^2$ and decreased to zero or a level lower than the first-mentioned level, and the pressure increasing and decreasing procedure is repeated several to several tens times whereby the resultant graphite becomes wrinkle-free.

As described before, the wrinkles or internal strains are produced in the carbonaceous films during the heat treatment. In the hot pressing step, it is important how to remove these defects. The intermittent application of pressure is very effective in the removal. The intermittent application of pressure is particularly described in examples.

Better results are obtained when the maximum pressure is varied depending on the temperature. The maximum value of the pressure is suppressed to a relatively low level in a low temperature range and is increased in a high temperature range. More particularly, when the temperature is 2000° C. or below, the pressure up to 50 kg/cm$^2$, preferably not higher than 20 kg/cm$^2$, is applied to the carbonaceous films at which the films are kept for a given time, e.g. several minutes, and then the pressure is returned to zero or a given low level, e.g. 10 kg/cm$^2$, followed by repeating the above cycle several to several tens times. Over 2000° C., the pressure is intermittently applied from 20 kg/cm$^2$ to a maximum level of not higher than 200 kg/cm$^2$ in the same manner as set out above wherein the maximum pressure level is reduced to a level lower than 20 kg/cm$^2$ or from 0 to 20 kg/cm and then the pressure application and reduction cycle is repeated a desired number of times.

Examples of this embodiment are described.

EXAMPLE 3

Each of 25 μm thick films of polyoxadiazole, aromatic polyamide and aromatic polyimide was placed between graphite plates and heated at a heating rate of 20° C./minute up to 1000° C., at which it was maintained for 1 hour and was thus heat treated, thereby obtaining a carbonaceous film.

Twenty carbonaceous films of the respective polymers were superposed and hot pressed by the use of a ultra-high temperature hot press, made by Chuugai Furnace Ind. Co., Ltd., thereby obtaining graphite blocks. The hot pressing was effected in such a way that while the films were heated at a rate of 10° C./minute in the temperature range of from 1000° to 2800° C., a pressure was applied to the films gradually from 0 to 20 kg/cm$^2$ at which the films were kept for a given time, and the pressure was reduced to zero, followed by repeating the pressure application and the reduction 12 times intermittently in the above temperature range. More specifically, a pressure was gradually increased from 0 to the maximum level of 20 kg/cm$^2$ in about 2 minutes, at which the films were kept for about 2 minutes, followed by returning to a pressure-free condition in about 1 minute. While keeping the pressure-free condition for 3 minute, the above procedure was repeated 12 times in total.

Thereafter, the temperature was raised to a level of higher than 2800° C. and the maximum pressure was elevated to 50 kg/cm$^2$. The intermittent pressure application procedure as stated above was repeated until the maximum temperature reached 3000° C. At 3000° C., the pressing for 1 hour under a pressure of 50 kg/cm$^2$ was effected. The physical properties of the resultant graphite blocks are shown in Table 4.

TABLE 4

| Film Material | Lattice Constant C. (angstroms) | Degree of Graphitization (%) | Electric Conductivity (S/cm) | Rocking Characteristic (°) |
| --- | --- | --- | --- | --- |
| polyoxadiazole | 6.708 | 100 | 19100 | 0.62 |
| aromatic polyamide | 6.708 | 100 | 19200 | 0.60 |
| aromatic polyimide | 6.708 | 100 | 20000 | 0.51 |

The above results demonstrate that the rocking characteristic of the graphite blocks is in the range of from 0.51° to 0.62° and is thus very excellent. The rocking characteristic of this example is better than that obtained in Example 1.

A further embodiment of the invention is described. As described before, for the producing of graphite blocks having good characteristics, the structure of the carbon precursor obtained by thermal decomposition of polymer is important. When a starting film is thick, it is difficult to obtain a carbon precursor with good quality. This is because the inner structure of the film is disturbed with gases generated from the inside of the film during the thermal treatment and thus, the molecular orientation in the inside of the film does not proceed satisfactorily.

In this embodiment, a plurality of polymer films having a thickness of from 1 to 400 μm are thermally treated so that the disorder of the inner structure is not produced, thereby obtaining a thick carbon precursor or carbonaceous film. This is based on the assumption that when a number of superposed polymer films are heat treated, part of gases produced can escape along the respective film surfaces and the molecules in the inside of the film can well be oriented along individual films which are relatively thin.

Figure 1B:
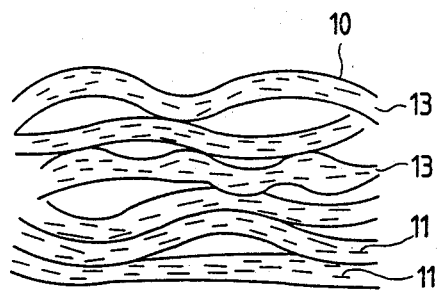
Figure 1C:
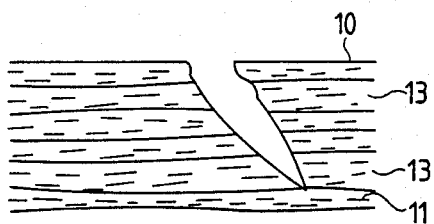

Reference is now made to FIGS. 1a to 1c and 2. FIGS. 1a to 1c show the inner structure of a carbonaceous film 10 obtained after the heat treatment. FIG. 1a shows a thick polymer film which has been heat treated, in which molecules 11 are in disorder, as shown, with a gas 12 being left without removal.

Figure 2:
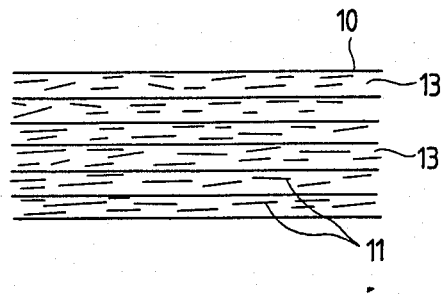
FIG. 2 is a schematic sectional view of the structure of carbonaceous films produced according to the invention.

FIG. 2 shows plural polymer films 13 of a relatively small thickness which have been superposed and heat treated. The molecules 11 are oriented substantially in one direction and no gas is contained in the respective films.

Since aromatic polyamides, aromatic polyimides and polyoxadiazoles which have a thermal decomposition temperature of from 400° to 600° C. are used as the films 11, the heat treatment for producing the carbonaceous film is preferably carried out at a temperature of from 400° to 1000° C.

In order that good molecular orientation of the carbonaceous film as shown in FIG. 2 is attained, it is important how to cause the thermal decomposition at the defined temperature. The polymer films 11 suffer a considerable degree of shrinkage along the film when heat treated. Heat treatment of a plurality of the films which are merely stacked will cause the films 11 to be deformed by the shrinkage as is particularly shown in FIG. 1b, showing the tendency toward the disorder of the inner structure. If the carbonaceous films 10 whose inner structure is in disorder are further graphitized at higher temperatures, the graphitization is attended with the internal strain. Graphite block with good characteristics cannot be expected.

In order solve the above problem, the heat treatment of the polymer films should preferably be effected while pressing the films from opposite sides so that the films do not shrink along the film surface. The carbonaceous films obtained by the heat treatment is made, however, of hard carbon and suffer considerable shrinkage during the thermal decomposition. If the thermal treatment is effected under pressure, there is the possibility that the carbonaceous films 10 are broken as is shown in FIG. 1c.

We found through a number of experiments on the pressure application that the thermal treatment under a pressure of from 1 to 4 kg/cm² produced good results on the molecular orientation in the carbonaceous film 10 with little cracks being produced. The magnitude of the pressure may depend on the total thickness of the superposed films and the treating temperature. When the total thickness exceeds 2 mm, the pressure may be over 4 kg/cm². In addition, over 800° C., the pressure over 4 kg/cm² may be applied without breakage of the films.

Another approach for obtaining well oriented carbonaceous films 10 is a procedure wherein the heat treatment of the superposed polymer films is carried out while inhibiting the films from expanding in the direction vertical to the film face, thereby preventing the disorder of the inner structure of the carbonaceous films 10. This is based on the fact that when thermally treated, the polymer films are significantly shrunk along the film face but suffer little shrinkage in the vertical direction. Accordingly, even though the shrinkage of the film in the direction parallel to the film face is allowed to take place but if the deformation or expansion of the film in the vertical direction is prevented, the disorder of the inner structure of the carbonaceous film 10 can be prevented.

Figure 3:
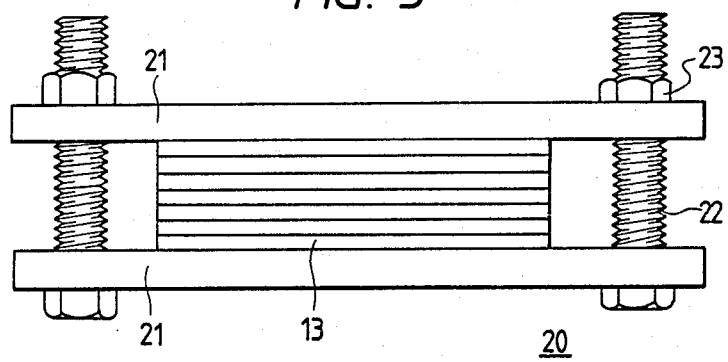
FIG. 3 is a plan view of a fixing instrument for thermal treatment.

FIG. 3 shows an example of a means for inhibiting the expansion of the films in the vertical direction with respect to the film face. In the figure, there is shown an instrument 20 having a pair of flat plates 21, 21 made, for example, of a stainless steel or graphite and bolts 22 and nuts 22 for fastening the plates 21, 21. The polymer films 13 are sandwiched between the plates 21, 21 and are appropriately tightened to an extent sufficient to prevent the films from expansion in the vertical direction. In this condition, the films are thermally treated. Any fixing instrument may be used if the construction and material used are capable of withstanding the thermal treatment.

The carbonaceous films obtained by the thermal treatment are graphitized under conditions used in the first and second embodiments, preferably under conditions of from 800° to 2800° C. at a pressure of not higher than 20 kg/cm² and then under condition of a temperature of not lower than 2800° and a pressure of not lower than 20 kg/cm² for bonding the graphite films into the block. Over 2800° C., a pressure not lower than 4 kg/cm² may be sufficient for the bonding of the films, and better bonding requires a pressure of not lower than 20 kg/cm².

Examples of this embodiment are described.

EXAMPLE 4

Five hundred polyimide films each having a thickness of 25 μm (Kapton H film, the commercial name of Du Pont De Nemours) were superposed and heated at a rate of 20° C./minute in an atmosphere of nitrogen while applying a constant pressure of 2 kg/cm², followed by keeping at 1000° for 1 hour, thereby obtaining carbonaceous films. Thereafter, the films were heated from room temperature at a heating rate of 10° C./minute in an atmosphere of argon and kept for graphitization at certain temperatures for 1 hour, followed by decreasing the temperature at a rate of 20° C./minute. The heating furnace used was a super-high temperature hot press, made by Chuugai Furnace Co., Ltd. The physical properties of the resultant graphite blocks are shown in Table 5 below.

TABLE 5

| Hot Pressing Temperature (°C.) | Lattice Constant (angstroms) | Degree of Graphitization (%) | Electric Conductivity (S/cm) | Rocking Characteristic (°) |
|---|---|---|---|---|
| 1600 | 6.88 | 0 | 1000 | — |
| 1800 | 6.87 | 6 | 1400 | 17 |
| 2000 | 6.81 | 40 | 2000 | 9.8 |
| 2200 | 6.763 | 65 | 4200 | 3.9 |
| 2600 | 6.715 | 96 | 8300 | 2.6 |
| 2800 | 6.710 | 98 | 14000 | 1.7 |
| 3000 | 6.708 | 100 | 19000 | 1.3 |

As will be apparent from the above results, the process in this embodiment is useful in obtaining very thick graphite blocks having good characteristics by the thermal treatment of a plurality of polymer films.

EXAMPLE 5

Two hundred films each having a thickness of 25 μm and made of each of polyoxadiazole, aromatic polyamide and aromatic polyimide were thermally treated in the same manner as in Example 4 to obtain carbonaceous films. For graphitization, the carbonaceous films of the respective polymers were treated at a pressure of 10 kg/cm² in a temperature range of from 1000° to 2000° C., at a pressure of 20 kg/cm² in a temperature range of from 2000° to 2800° C. and at a pressure of 40 kg/cm² at 3000° C. The properties of the resultant graphite blocks are shown in Table 6.

TABLE 6

| Film Material | Lattice Constant C. (angstroms) | Degree of Graphitization (%) | Electric Conductivity (S/cm) | Rocking Characteristic (°) |
|---|---|---|---|---|
| aromatic polyimide | 6.708 | 100 | 20000 | 0.8 |
| polyoxadiazole | 6.708 | 100 | 18500 | 1.1 |
| aromatic polyamide | 6.708 | 100 | 19000 | 1.0 |

The above results demonstrate that all the starting polymers can provide the graphite blocks of high quality.

EXAMPLE 6

Two hundred films each having a thickness of 50 μm and made of each of polyoxadiazole, aromatic polyamide and aromatic polyimide were thermally treated in the same manner as in Example 4 except that the pressure was not applied but a fixing instrument as shown in FIG. 3 was used to fix the films, thereby obtaining carbonaceous films. The carbonaceous films were grapitized or hot pressed in the same manner as in Example 5 to obtain graphite blocks. The properties of the graphite blocks are shown in Table 7.

TABLE 6

| Film Material | Lattice Constant C. (angstroms) | Degree of Graphitization (%) | Electric Conductivity (S/cm) | Rocking Characteristic (°) |
|---|---|---|---|---|
| aromatic polyimide | 6.708 | 100 | 20000 | 0.78 |
| polyoxadiazole | 6.708 | 100 | 18700 | 1.1 |
| aromatic polyamide | 6.708 | 100 | 19100 | 1.0 |

From the above, it will be seen that the fixing of the superposed polymers films with a suitable means for preventing the expansion in the direction vertical to the film face is effective in producing thick graphite blocks having good characteristics.

As is different from the first embodiment wherein polymer films are initially thermally treated one by one and then a desired number of the resultant carbonaceous films are superposed and hot pressed for graphitization, this embodiment enables one to thermally treat a desired number of polymer films and then immediately hot pressed. This makes it easier to produce a thick graphite block with good characteristics.

The graphite blocks obtained in the first to third embodiments are all suitable for use as X-ray or neutron ray monochromators, filters, and other optical elements.

A more specific embodiment wherein single or double bent graphite articles for use as radiation optical elements are fabricated are described.

In this embodiment, starting polymer films are those used in the first to third embodiments described before. In these embodiments, it is preferred that starting films have a thickness of from 1 to 200 μm although thicker films having a thickness up to 400 μm may be used. Over 200 μm, it is rather difficult to attain a rocking characteristic of not higher than 0.5°.

The starting polymer films may be heat treated one by one as in the first and second embodiments or may be heat treated as superposed in the third embodiment.

In this case, the heat treatment is carried out at a temperature higher than the thermal decomposition temperature of the aromatic polyamides, aromatic polyimides or polyoxadiazoles, i.e. at a temperature of from 400° to 2000° C. In this embodiment, it is necessary to make a bent-type graphite crystal article, so that the heat treatment temperature should preferable not lower than 1000° C. This is because the carbonaceous film obtained by the heat treatment at temperatures lower than 1000° C. is made of hard carbon and is not flexible with a difficulty in curving such a hard carbon film. Over 2000° C., the carbonaceous film becomes flexible is able to be easily curved as desired.

A plurality of the carbonaceous films which have been obtained by the heat treatment of starting films either one by one or after superposition are hot pressed under conditions defined with respect to the first to third embodiments.

In this case, a plurality of carbonaceous films have to be superposed for the hot pressing. As stated before, if a thick film is directly hot pressed, good characteristics cannot be obtained.

Figure 4:
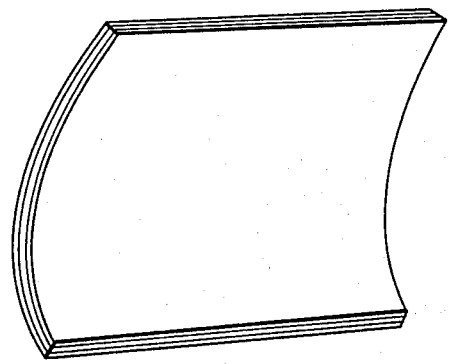
FIG. 4 is a schematic perspective view of a radiation optical element made of a single-bent graphite article.

The carbonaceous films are hot pressed after having been placed between a pair of press molds having a curved form, by which the films are converted into a curved graphite block. If the curved form is of a single bent type as shown in FIG. 4, the hot pressing can be relatively easily performed.

Figure 5:
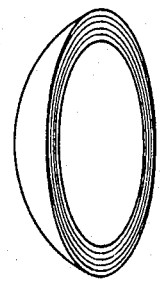
FIG. 5 is a schematic perspective view of a radiation optical element made of a double-bent graphite article.

If, however, the curved form is of the double bent type as shown in FIG. 5, the hot pressing may not necessarily be succeeded since the carbonaceous films are not so flexible. If double bent types of graphite crystal articles are obtained without a failure, starting polymer films should preferably be molded in a desired double bent shape such as the dome shape shown in FIG. 5. The double bent shape is readily obtained by casting a solution of polymer into a mold of such a shape.

The double bent polymer films are likewise heat treated and hot pressed to obtain a graphite article of the desired shape.

The graphite radiation optical element, whichever the single bent type or the double bent type, have ab planes of the graphite crystal clearly superposed and thus, have good characteristics including the rocking characteristic. It will be noted that since the bent-type graphite crystal is able not only to reflect, bus also to converge X-rays or neutron rays, more intense rays than those from flat crystals can be obtained.

Examples of this embodiment are described.

EXAMPLE 7

A polyimide film (Kapton H film) having a thickness of 12.5 μm was sandwiched between quartz plates and heated up to 1000° C. at a rate of 20° /minute in an atmosphere of nitrogen, followed by keeping at 1000° C. for 1 hour. The thus heat treated films were sandwiched between graphite substrates, heated from room temperature at a rate of 10° C./minute and heat treated at 1600° C. for 1 hour, followed by decreasing the temperature at a rate of 20° C./minute to obtain carbonaceous films. The heating furnace used was a carbon heating furnace Model 46-1, made by Shinsei Electric Furnace Co., Ltd.

Fifty carbonaceous films thus obtained were hot pressed along a graphite press instrument having a single bent-type curved surface with a radius of curvature of 12.4 cm. The hot pressing apparatus used was a super-high temperature hot press available from Chuugai Furnace Ind. Co., Ltd. The hot pressing was effected at 3000° C. at a pressure of 20 kg/cm$^2$ for 1 hour, thereby obtaining a 350 μm thick single bent-type graphite crystal as shown in FIG. 4. The rocking characteristic of the graphite crystal was 0.32°.

The graphite crystal obtained in this manner was subjected to an X-ray spectroscope to determine characteristics against an X-ray. A CuKα ray was incident on the graphite crystal surface through a 1 mm φ opening of a Mo plate and an X-ray was measured on a photographic plate placed at the focal position. The image of the X-ray on the photographic plate had a length of 1 mm and a width of about 18 mm, thus the crystal having good converging properties. The intensity of the X-ray was as large as 2.8 times that of flat graphite crystal. Thus, the bent-type crystal was better in the intensity.

EXAMPLE 8

The Kapton films having different thicknesses of 25, 50, 125, 200 and 400 μm were each heat treated in the same manner as in Example 7, thereby obtaining carbonaceous films of the respective thicknesses.

25, 13, 7, 4 and 2 carbonaceous films obtained from the respective thicknesses were, respectively, superposed and hot pressed in the same manner as in Example 7 to obtain single bent-type graphite crystals. These graphite crystals have, respectively, rocking characteristics values of 0.35, 0.41, 0.47, 0.61 and 0.95. The rocking characteristic of graphite crystal appropriately utilizable as a monochromator crystal for spectral analysis is 1° or below and better results are obtained when the rocking characteristic is 0.5° or below. Accordingly, the thickness of from 1 to 200 μm is preferred.

EXAMPLE 9

A polyimide material commercially supplied as a solution (Torayneese, available from Toray Co., Ltd.) was applied onto a substrate by means of a doctor blade to form a 50 μm thick film, followed by heating to 160° C. to evaporate part of the solvent. The polymer film having still sufficient flexibility was removed from the substrate and placed in a dome-shaped mold with an aperture of 50 mm φ by the use of a vacuum molding machine to obtain a dome-shaped molding. The thus obtained polymer molding was heat treated in an electric furnace at 180° C. for 2 hours and hardened, followed by heat treatment in the same manner as in Example 7 to obtain a dome-shaped carbonaceous film. The above procedure was repeated to obtain similar carbonaceous films. Twenty dome-shaped carbonaceous films were superposed and hot pressed by the use of a dome-shaped mold under the same conditions as in Example 7, thereby obtaining a double bent, dome-shaped graphite crystal articles as shown in FIG. 5.

The rocking characteristic of the double bent, dome-shaped graphite article was 0.48°. The graphite article was subjected to measurement of characteristics against an X-ray. A CuKα ray was incident on the graphite crystal surface through a 1 mm φ opening of a Mo plate and a reflected X-ray was measured on a photographic plate placed at the focal position. The image of the X-ray on the photographic plate was a spot with an about 22 mm φ, thus the crystal having good converging properties. The intensity of the X-ray was about 15 times higher than that of a flat graphite crystal.

EXAMPLE 10

25 μm thick polyamide films (made by Asahi Chem. Ind. Co., Ltd.) and 25 μm thick polyoxadiazole films (Furukawa Denko Co., Ltd.) were each subjected to heat treatment and hot pressing in the same manner as in Example 7, thereby obtaining single bent-type graphite crystal articles. Forty carbonaceous films were used for the hot pressing. The rocking characteristic values of the graphite articles obtained from the polyamide and polyoxadiazole films were, respectively, 0.40° and 0.38°. Thus, these graphite articles were similar in the rocking characteristic to the graphite article obtained from the polyimide films as in Example 7. The converging properties against the CuKα ray were similar to those of the graphite article obtained in Example 7 and the intensity of the X-ray was as high as 2.5 times and 2.6 times that of a flat graphite crystal.

As will be apparent from the above examples, substantially perfect single or double bent-type graphite articles as will be difficult to obtain by prior art processes can be produced. The radiation optical element made of the bent-type graphite article is better than known counterparts when used as an X-ray or neutron ray monochromator or filter. Especially with double bent-type graphite articles, preliminary shaped polymer films are used and such articles can be readily obtained.

What is claimed is:

1. A process for producing a graphite block, which comprises
    separately forming a plurality of 1 to 400 μm thick films of a polymer selected from the group consisting of aromatic polyimides, aromatic polyamides and polyoxadiazoles;
    heat treating the films at a temperature sufficient to convert them to carbonaceous films;
    superposing the plurality of carbonaceous films; and
    subjecting the plurality of superposed carbonaceous films to hot pressing first at a pressure not higher than 20 kg/cm$^2$ and a temperature not higher than 2800° C. and then at a pressure higher than 20 kg/cm$^2$ and a temperature higher than 2800° C. for a time sufficient for graphitization to occur and to form a graphite block.
2. The process of claim 1, wherein
    the heat treatment is effected at a temperature of 450° to 2000° C.
3. The process of claim 1, wherein
    the heat treatment step and the hot pressing step are conducted in an inert gas atmosphere.
4. A process for producing a graphite block, which comprises
    separately forming a plurality of 1 to 400 μm thick films of a polymer selected from the group consisting of aromatic polyimides, aromatic polyamides and polyoxadiazoles;
    heat treating the films at a temperature sufficient to convert them to carbonaceous films;
    superposing the plurality of carbonaceous films; and
    subjecting the plurality of superposed carbonaceous films to hot pressing at a temperature not lower than 800° C. and at a pressure first increasing from zero to not higher than 200 kg/cm$^2$ and then decreasing to a level not lower than zero; and
    repeating the increase and decrease of pressure during hot pressing up to several tens of times to obtain a wrinkle-free graphite block.
5. The process of claim 4, wherein
    the hot pressing step is conducted at a temperature of up to 2000° C. and first at a pressure of up to 20 kg/cm$^2$ for a given period of time, and then decreasing the pressure to a level not lower than zero;
    repeating the hot pressing step up to several tens of times; and
    then further hot pressing the films at a temperature higher than 2000° C. and a pressure higher than 20 kg/cm$^2$ for a given period of time, and then decreasing the pressure to a level not higher than 20 kg/cm$^2$; and
    repeating the further hot pressing step up to several tens of times to obtain a graphite block.
6. A process for producing a graphite block, which comprises
    heat treating a plurality of 1 to 400 μm thick films of a polymer selected from the group consisting of aromatic polyimides, aromatic polyamides and polyoxadiazoles at a temperature sufficient to convert the films to carbonaceous films; and
    hot pressing the plurality of the carbonaceous films first at a pressure of not higher than 20 kg/cm$^2$ and a temperature not higher than 2800° C. for a given period of time, and then at a pressure higher than 20 kg/cm$^2$ and a temperature higher than 2800° C. for a period of time sufficient for graphitization to occur and to form a graphite block.
7. The process of claim 6, wherein
    the heat treatment is effected at a temperature of 400° to 1000° C. under pressure.
8. The process of claim 6, wherein
    the films have a face where the pressure is applied; and
    the heat treatment is effected at a temperature of 400° to 1000° C. while inhibiting the expansion of the films in a direction perpendicular to the film's face.
9. The process of claim 6, wherein
    the hot pressing step is conducted at a temperature not lower than 800° C. and the pressure is applied intermittently to produce a wrinkle-free graphite block.
10. The process of claim 9, wherein
    the hot pressing step is effected at a temperature of up to 2000° C. and first at a pressure of up to 20 kg/cm$^2$ for a given period of time and then decreasing the pressure to a value of down to zero;
    repeating the hot pressing step up to several tens of times;
    then further hot pressing the films at a temperature higher than 2000° C. and first at a pressure higher than 20 kg/cm$^2$ for a given period of time and then decreasing the pressure to a level not higher than 20 kg/cm$^2$; and
    repeating the further hot pressing step up to several tens of times to obtain a graphite block.
11. A process for producing a curved graphite article which comprises
    forming a plurality of 1 to 400 μm thick films of a polymer selected from the group consisting of aromatic polyimides, aromatic polyamides and polyoxadiazoles;
    heat treating the films at a temperature sufficient to convert the films to carbonaceous films;
    superposing the plurality of carbonaceous films; and
    subjecting the plurality of superposed carbonaceous films to hot pressing along a curved surface first at a pressure not higher than 20 kg/cm$^2$ and a temperature not higher than 2800° C. and then at a pressure higher than 20 kg/cm$^2$ and a temperature higher than 2800° C. for a time sufficient for graphitization of the product to occur.
12. The process of claim 11, wherein
    the heat treatment is effected at a temperature which is higher than the decomposition temperature of the polymer film and in the range of 400° to 2000° C.
13. The process of claim 11, wherein
    the heat treatment is effected at a temperature not lower than 1000° C.
14. The process of claim 11, wherein
    the thickness of each of the plurality of films is 1 to 200 μm.
15. The process of claim 11, wherein
    the polymer films and the resulting carbonaceous films have a dome-shaped form; and
    the plurality of dome-shaped carbonaceous films are hot pressed along a dome-shaped surface to form a double bent-type graphite article.
16. The process of claim 15, wherein each dome-shaped film is obtained by
    applying a solvent solution of the polymer onto a substrate;
    evaporating part of the solvent to obtain a film; and
    subjecting the resultant film to vacuum molding in a dome-shaped mold.

* * * * *